United States Patent
Singh et al.

(10) Patent No.: US 9,501,336 B2
(45) Date of Patent: Nov. 22, 2016

(54) SYSTEM AND METHOD FOR UNIFYING THE LISTING AND LAUNCHING OF APPLICATIONS AND PACKAGES SPREAD ACROSS MULTIPLE DOMAINS

(71) Applicants: BlackBerry Limited, Waterloo (CA); 2236008 Ontario Inc., Waterloo (CA)

(72) Inventors: Ravi Singh, Toronto (CA); Daniel Jonas Major, Ottawa (CA); Sivakumar Nagarajan, Ottawa (CA); Kevin Goodman, Nepean (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 14/290,316

(22) Filed: May 29, 2014

(65) Prior Publication Data
US 2015/0347197 A1    Dec. 3, 2015

(51) Int. Cl.
G06F 3/00    (2006.01)
G06F 9/44    (2006.01)
G06F 9/46    (2006.01)
G06F 13/00   (2006.01)
G06F 9/54    (2006.01)

(52) U.S. Cl.
CPC ............. *G06F 9/541* (2013.01); *G06F 9/441* (2013.01); *G06F 9/542* (2013.01)

(58) Field of Classification Search
None
See application file for complete search history.

(56) References Cited

U.S. PATENT DOCUMENTS

| | | | |
|---|---|---|---|
| 2005/0114378 A1* | 5/2005 | Elien et al. | 707/102 |
| 2009/0274062 A1* | 11/2009 | Yan et al. | 370/254 |
| 2011/0154328 A1 | 6/2011 | Mo et al. | |
| 2013/0117742 A1 | 5/2013 | Newell | |
| 2013/0298140 A1* | 11/2013 | Wolfe et al. | 719/319 |

FOREIGN PATENT DOCUMENTS

EP    2151757 A1    2/2010

OTHER PUBLICATIONS

Canadian Intellectual Property Office, Office Action on Application No. 2,892,715, Issued on May 6, 2016.
European Patent Office, Extended European Search Report on Application No. 15169272.0, Issued on Dec. 14, 2015.

* cited by examiner

*Primary Examiner* — Craig Dorais
(74) *Attorney, Agent, or Firm* — Moffat & Co.

(57) ABSTRACT

A method at a computing device having a plurality of concurrently operating domains for providing a unified home screen, the method sending a request for package information from a home screen application on the computing device; receiving the request for package information at a unified package manager on the computing device; requesting, from the plurality of concurrently operating domains, package information; receiving package information from at least one of the plurality of concurrently operating domains at the unified package manager on the computing device; decorating the received package information with domain information for a domain from which the package information was received at the unified package manager on the computing device; and providing the decorated package information to the home screen application.

20 Claims, 7 Drawing Sheets

SYSTEM AND METHOD FOR UNIFYING THE LISTING AND LAUNCHING OF APPLICATIONS AND PACKAGES SPREAD ACROSS MULTIPLE DOMAINS

FIELD OF THE DISCLOSURE

The present disclosure relates to mobile operating systems and in particular relates to a mobile device running a plurality of operating systems concurrently.

BACKGROUND

Mobile devices, including smartphones, tablets, digital assistants, laptop computers, among others include both hardware and software. The software typically includes at least one domain having an operating system on which the applications of the device run.

In some cases, it may be desirable for security purposes to run multiple domains, each with virtualized instances of an operating system on a single piece of hardware, such as a smartphone. For example, one use of such a system may be to allow one domain to host corporate data and applications while a second domain may host personal data and applications.

However, even if a device is running multiple domains, it may be desirable to have a single home screen for such device, displaying applications from the plurality of domains.

BRIEF DESCRIPTION OF THE DRAWINGS

The present disclosure will be better understood with reference to the drawings, in which.

DETAILED DESCRIPTION OF THE DRAWINGS

The present disclosure provides a method at a computing device having a plurality of concurrently operating domains for providing a unified home screen, the method comprising: sending a request for package information from a home screen application on the computing device; receiving the request for package information at a unified package manager on the computing device; requesting, from the plurality of concurrently operating domains, package information; receiving package information from at least one of the plurality of concurrently operating domains at the unified package manager on the computing device; decorating the received package information with domain information for a domain from which the package information was received at the unified package manager on the computing device; and providing the decorated package information to the home screen application.

The present disclosure further provides a computing device having a plurality of concurrently operating domains and capable of providing a unified home screen, the computing device comprising: a processor; and memory, wherein the computing device is configured to: send a request for package information from a home screen application on the computing device; receive the request for package information at a unified package manager on the computing device; request, from the plurality of concurrently operating domains, package information; receive package information at least one of the plurality of concurrently operating domains at the unified package manager on the computing device; decorate the received package information with domain information for a domain from which the package information was received at the unified package manager on the computing device; and provide the decorated package information to the home screen application.

Figure 1:
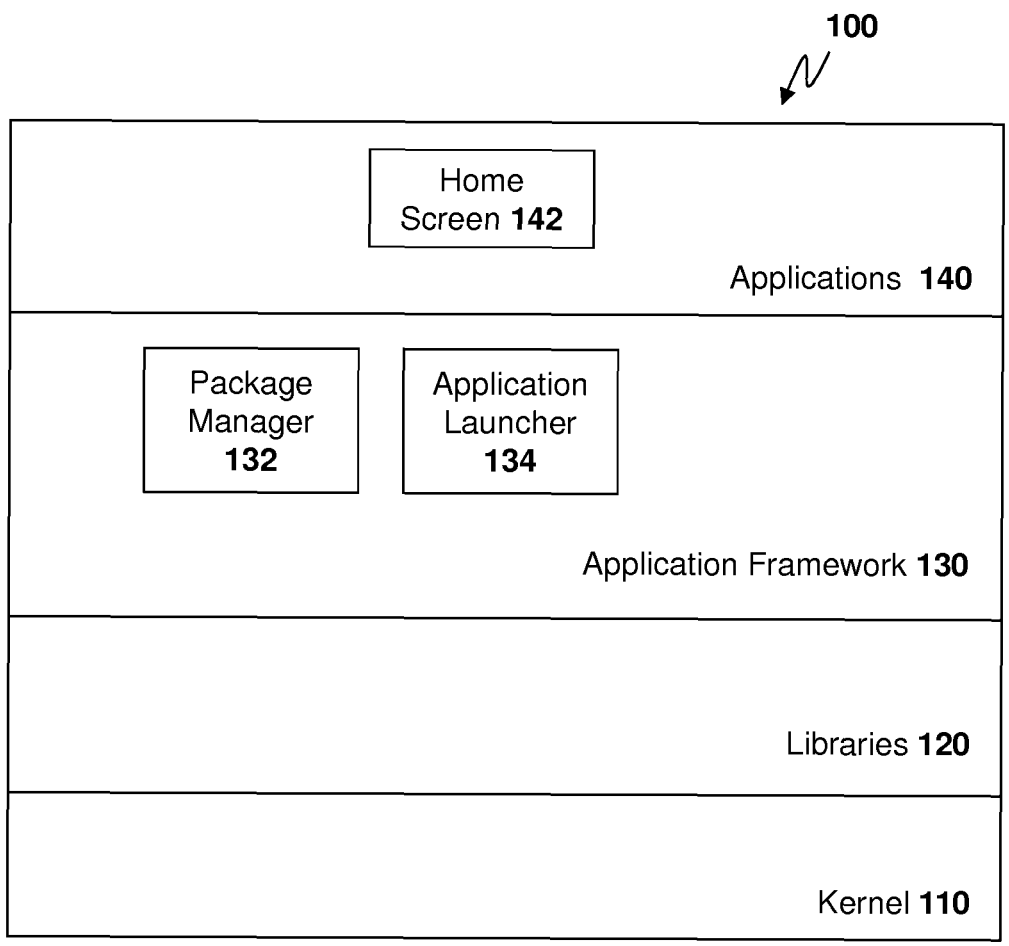
FIG. 1 is a simplified operating system stack for a mobile device operating system.

Reference is now made to FIG. 1, which shows one example of a simplified operating system stack 100. While various operating systems could be configured differently, similar logical elements may exist between operating systems.

The operating system of FIG. 1 includes a kernel 110, which may include various elements including device drivers, memory management, process management, among other functionality.

Above kernel 110 is a libraries layer 120, which may include libraries for applications to utilize.

Above the libraries layer 120 is an application framework layer 130, which includes various functionality for supporting applications. Two exemplary functions in accordance with the present disclosure that are found within this layer are a package manager 132 and an application launcher 134.

Specifically, package manager 132 is a logical component capable of tracking and providing a list of installed applications on a computing device.

Application launcher 134 is a logical component involved in the launching of applications and managing of launched applications.

Each of package manager 132 and application launcher 134 are discussed in more detail below.

Above the application framework layer 130 is an applications layer 140, in which the application code developed for the computing device is stored. In a mobile device, one application that typically resides in applications layer 140 is home screen 142, which may display one or more icons or applications on a display of the mobile device.

Figure 2:
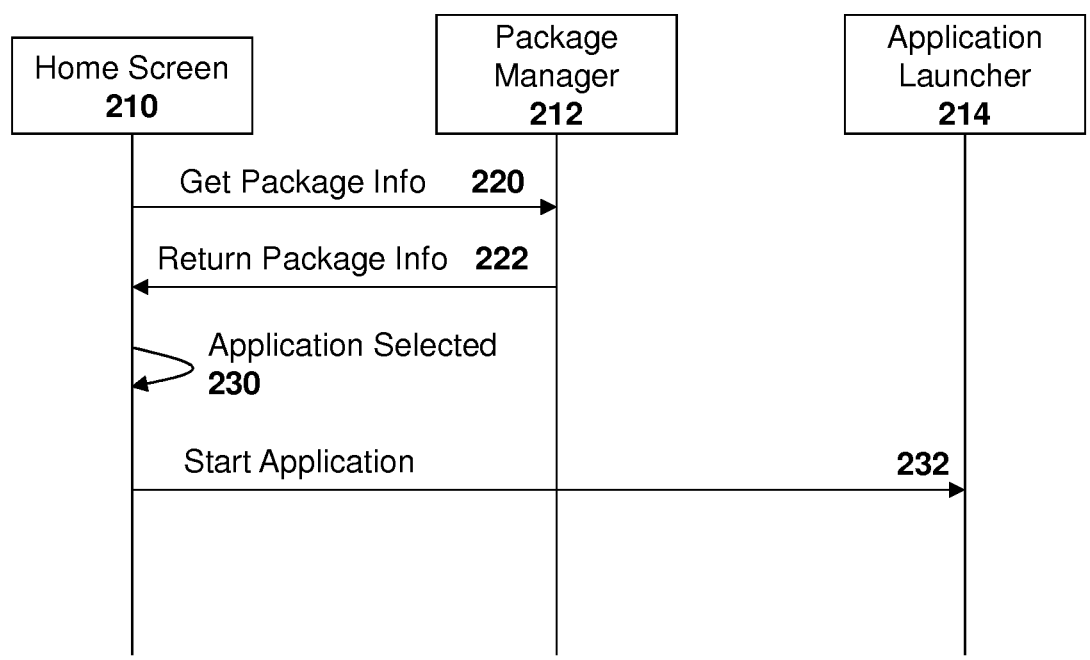
FIG. 2 is a flow diagram illustrating the obtaining of information for a home screen and the launching of an application.

Reference is now made to FIG. 2, which shows an example data flow diagram of the functionality for a home screen to populate itself with information regarding installed applications/packages, such as application names, icons and identifiers. The figure further shows the data flow for launching an application.

As used herein, an application or packages are interchangeable terms, and may include various software including an executable file such as .exe for a WINDOWS™ Mobile Operating System, an application on an iOS™ platform, an .apk from an Android™ Operating System, a .bar from a BlackBerry™ operating system, among others In FIG. 2, home screen application 210 provides a graphic representation of at least some of the installed applications by requesting, from package manager 212, package information, as shown by message 220. In some embodiments, message 220 may utilize pre-defined application program interfaces (APIs) for the communication.

Package manager 212, upon receiving the request from home screen 210, obtains and returns the package information, as shown by message 222. In particular, the package manager 212 may return various information for each package on the computing device. For example, the package manager may return package information that includes a package name or identifier, a friendly name and icon information, among other information. The package name or identifier may provide a unique key or identifier which may not necessarily be in a human readable form. The friendly name that a user sees on the screen of a mobile device, as well as information such as the icon or a link to the icon for the application may be included in message 222.

Home screen 210 may then utilize the package information to display icons and application names to a user of the mobile device.

If the home screen 210 requires further information after receiving message 222, further queries may be made to package manager 212. For example if the home screen 210 needs the size of an application, this may be determined through further messaging with package manager 212 in some embodiments. In other embodiments other information besides the identifiers, names or icons may be provided.

Once home screen 210 has all of the information from package manager 212, it may create a user interface.

Subsequently, an icon or an application may be launched, as shown by arrow 230. This may, for example, be done by a user interacting through a user interface of a computing device. However, other ways to launch applications are also possible.

Home screen 210 then sends a message 232 to application launcher 214 to launch the selected application.

While the above is possible in an environment having a single operating system or a single instance of an operating system, in accordance with the present disclosure, and as indicated above, it may be desirable for security purposes to run multiple virtualized instances of an operating system on a single piece of hardware.

In some implementations, a single user device may include multiple domains or perimeters that logically separate computer resources (e.g., applications, data, network access, configuration files) such that a domain may be prevented from accessing resources included in a different domain. For example, the domains may prevent personal resources in one domain may be prevented from accessing corporate resources in another domain or vice-versa. Keeping corporate data, applications, and networks isolated from personal data, applications, and networks is desirable because a user can use a single device to separately access the different groups of resources. In other words, an enterprise may extend a secured domain on a single user device without interfering with the user's personal experience on the same device. In some embodiments, the device may also comprise a hybrid domain that allows access to data in the other domains as needed. This hybrid domain may, for example, be used to show unified inbox applications that shows e-mail messages from all of the domains. In other embodiments, different types and numbers of domains could be included on the device.

In some embodiments, each domain may be associated with its own virtualized instance of an operating system. While the relationship between domains and operating systems may not always be one to one, here we will assume that each domain on the device has its own operating system and its own operating system stack. While throughout this application, reference is made to multiple operating systems, those of skill in the art will recognize that this may refer to multiple instances or multiple virtual operating systems.

The security aspect of multiple domains comes from the fact, for example, that each domain may be sandboxed and firewalled from the other domains. Such segregation may, for example, prevent data and corporate applications, as well as network access to the corporate resources, from leaking into a personal domain, and vice versa.

However, if such environment is used on a smartphone, it may still be desirable to have a single home screen application that can list applications spread out over multiple host domains. In this way, a user of the mobile device may see, on a single screen, what applications are installed on the various domains and may launch them from a central location. Such single home screen application is also referred to herein as a unified home screen application, and presents a unified home screen to a user. For example, in the case of a device with personal and corporate domains, the unified home screen may show applications from both domains to a user of the device. This may allow the user to select a corporate application or view data stored in the corporate domain by selecting a first displayed icon, or to select a personal application or show personal data by selecting a second displayed icon.

Further, in accordance with the present disclosure, the home screen application, as much as possible, should not be aware that it is actually displaying applications across multiple domains. For example, it may be desirable to reuse one or more home screen applications in an environment having a plurality of domains without having to rewrite the home screen applications.

In accordance with some embodiments of the present disclosure, the home screen continues to call the same application program interfaces (APIs) that it would have called in a single operating system environment. In this case, the changes which allow the system to function in a multiple domain environment are made at a lower level of the operating system stack rather than that of the home screen.

Figure 3:
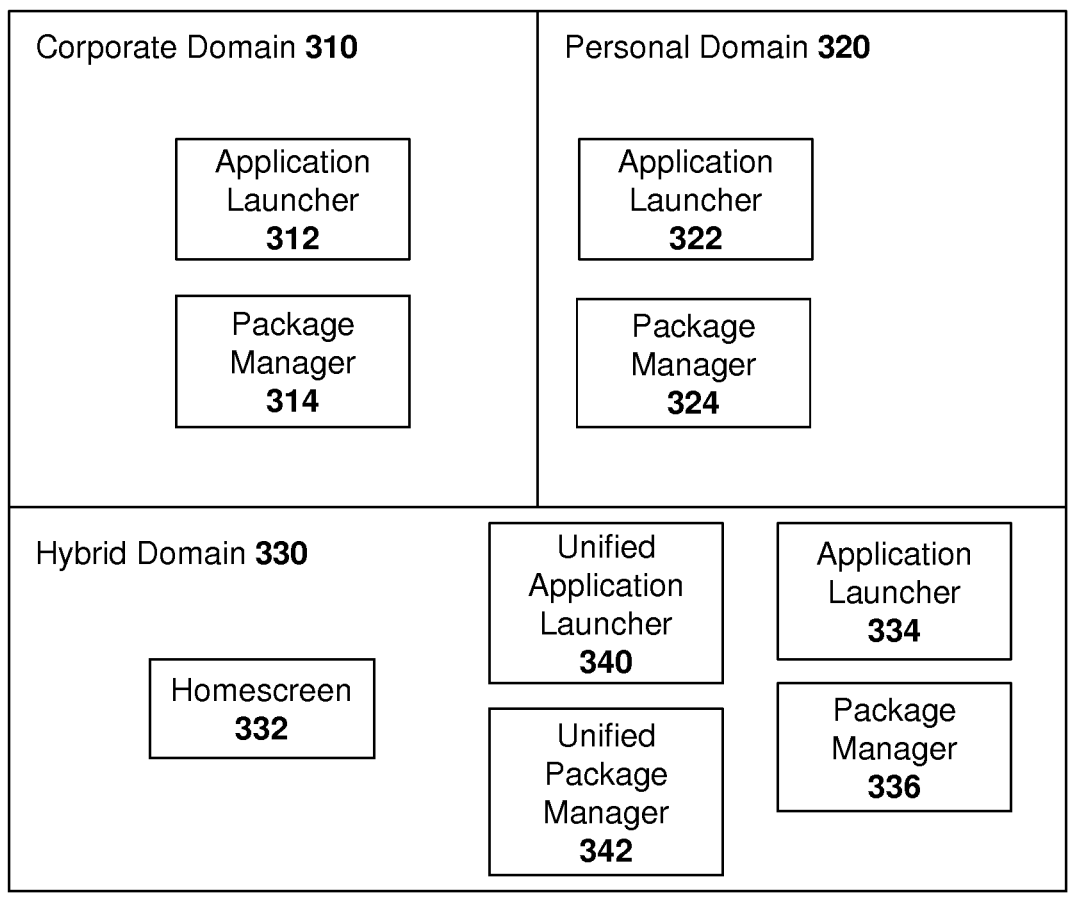
FIG. 3 is a block diagram illustrating a system having three domains and various components therein.

Reference is now made to FIG. 3. FIG. 3 shows an exemplary diagram of a system having three domains, namely a corporate domain 310, a personal domain 320 and a hybrid domain 330, each with its own operating system. However, the example of FIG. 3 is merely exemplary and further domains may be utilized in accordance with the present disclosure.

In accordance with the embodiment of FIG. 3, each of corporate domain 310, personal domain 320 and hybrid domain 330 include their own operating system stack. As part of each operating system stack, each domain includes an application framework layer with an application launcher and a package manager. In particular, in the embodiment of FIG. 3, corporate domain 310 includes an application launcher 312 and package manager 314. Personal domain 320 includes an application launcher 322 and a package manager 324. Hybrid domain 330 includes an application launcher 334 and a package manager 336.

Since hybrid domain 330 has visibility for all domains on the device, a home screen application 332 may be placed within this domain.

Further, in order to allow home screen 332 to see all of the applications in the various domains, a unified application launcher 340 and a unified package manager 342 are provided in accordance with the embodiments herein. The unified application launcher 340 and unified package manager 342 are part of the hybrid domain 330 and are therefore allowed to have special access to the various domains on the computing device.

In order to accommodate various home screens 332, the APIs remain unchanged and instead, the unified application launcher 340 and unified package manager 342 intercept the API calls from home screen 332 and can then handle the retrieval of package information from the various domains and the launching of applications within the various domains.

Figure 4:
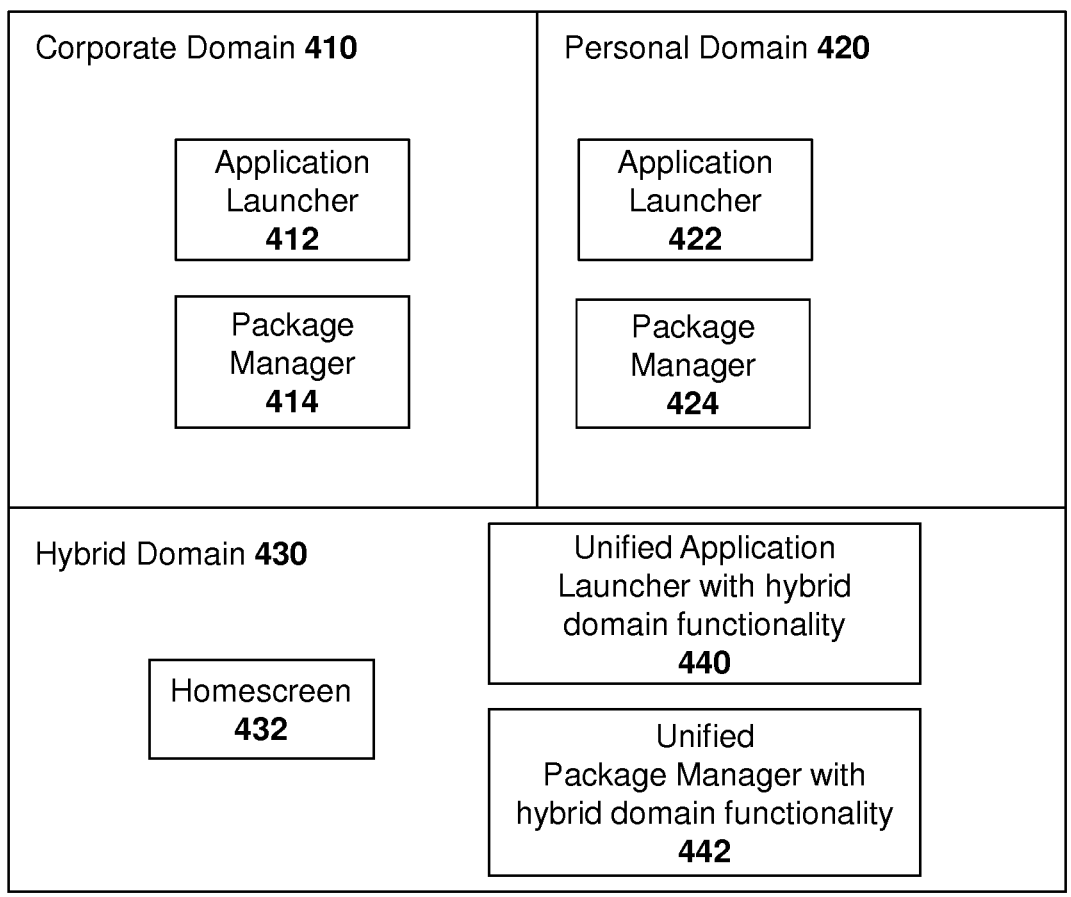
FIG. 4 is a block diagram illustrating an alternative system having three domains and various components therein.

Referring to FIG. 4, FIG. 4 shows an alternative embodiment in which the unified application launcher 440 and unified package manager 442 include the functionality of the application launcher and package manager within the hybrid domain 430. In particular, as seen in FIG. 4, corporate domain 410 and personal domain 420 both include an application launcher 412 and 422 respectively. Similarly, each contains a package manager, namely package manager 414 within corporate domain 410 and package manager 424 within personal domain 420.

However, unlike FIG. 3, in hybrid domain 430, the unified application launcher 440 and unified package manager 442 assume the roles of the application launcher and package manager for hybrid domain 430 as well as assume the functionality as described below.

Figure 5:
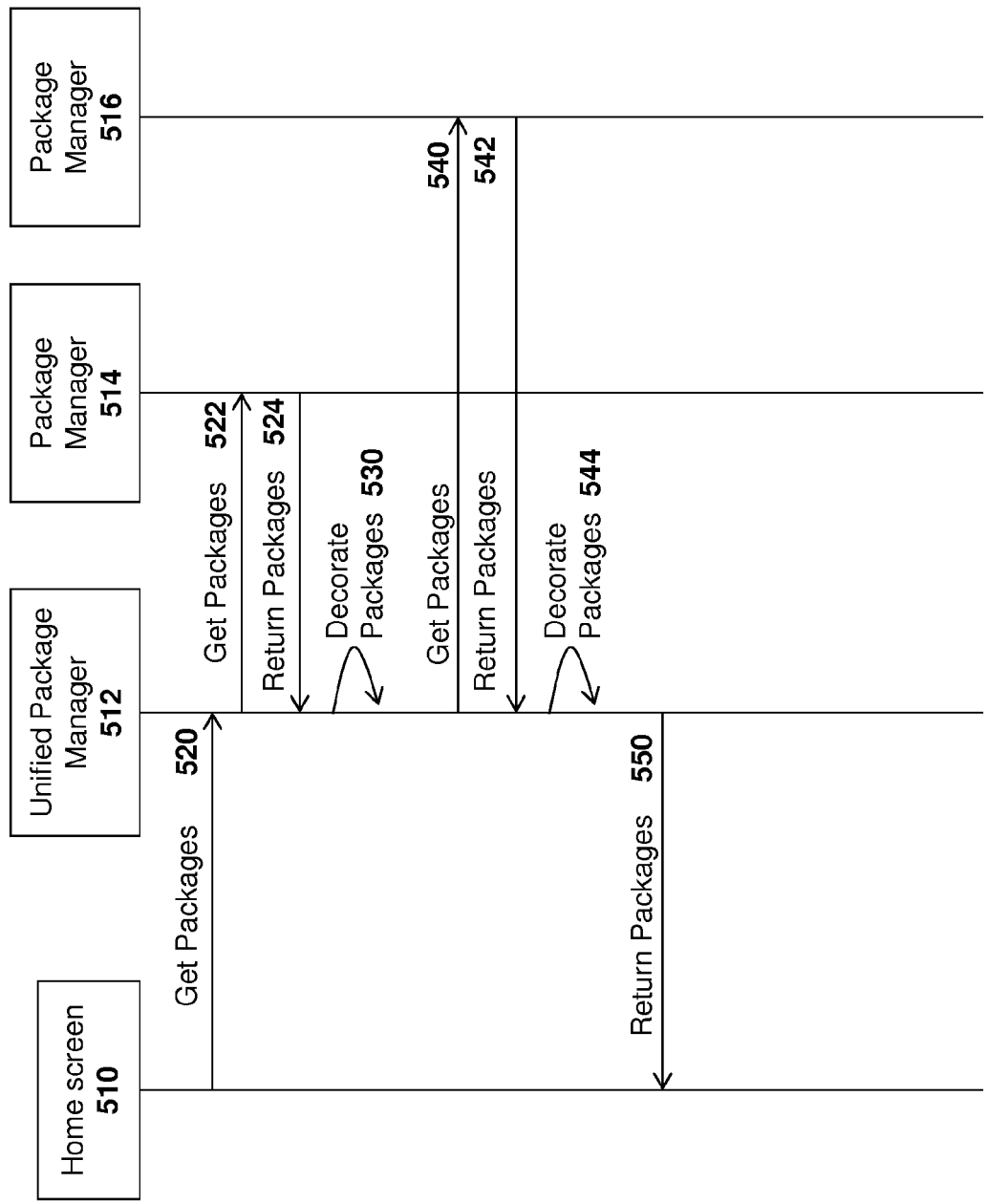
FIG. 5 is a dataflow diagram showing retrieving information for a home screen from a plurality of domains.

Reference is now made to FIG. 5, which shows a process for a home screen application 510 to get a list of installed applications on a device having multiple domains. In particular, home screen 510 communicates with a unified package manager 512 located within the same domain as the home screen 510.

Unified package manager 512 may communicate with various package managers, including package manager 514 and package manager 516 in the example of FIG. 5. One or both of package manager 514 and package manager 516 may be in different domains from that of unified package manager 512. Thus, if the unified package manager 512 does not include the functionality of the package manager on the hybrid domain then one of package manager 514 or 516 could be on the hybrid domain. Further, the use of only two package managers in the example of FIG. 5 is merely used for illustrative purposes, and unified package can communicate with a plurality of other package managers.

In the embodiment of FIG. 5, home screen application 510 calls a normal set of APIs to request a list of installed applications and their icons. This is shown with message 520. The unified package manager 512 intercepts the request and attempts to obtain the requested information across the different domains for a list of installed applications on the device.

In particular, as seen in the embodiment of FIG. 5, unified package manager 512 sends message 522 to package manager 514 and in response gets a list of packages in the domain in which package manager 514 resides. The communication between unified package manager 512 and package manager 514 may utilize the standard APIs for communicating with a package manager, with the addition of specifying the domain on which the package manager resides. If package manager 514 is on the hybrid domain, the APIs may however need to be different or the query will need to be specific to the package manager since the unified package manager 512 is already intercepting the APIs from home screen 510.

As seen by arrow 530, unified package manager 512 then decorates the packages that were received in message 524. As used herein, the decoration of a package means adding domain information to the package name to specify which domain the package came from. An example of the decoration would, for example, be if an application resides in the enterprise domain, instead of simply returning the package identifier of the application as "package.name", the package would have the domain name incorporated, for example, as "enterprise:package.name". In one embodiment, the decoration occurs on the package identifier, which is not seen by a user of the computing device and is instead used to identify a particular package or application.

Message 524 may further include the icons for the packages from the package manager 514. This information may be included since home screen 510 may not be able to query on data directly across the file system of other domains. In other embodiments, if the package information at message 524 does not include icons, further messaging may occur between unified package manager 512 and package manager 514 to receive such icon data or other data that the unified package manager requires.

Similarly, unified package manager may communicate with other package managers such as package manager 516. As seen in the example of FIG. 5, unified package manager sends message 540 to package manager 516 and in response, a message 542 is returned with package information. Unified package manager 512 may then decorate the packages with the domain name of package manager 516 as shown by arrow 544.

Once unified package manager 512 has queried all of the package managers for all the operating systems running on the device, the unified package manager may create a message 550, which returns the package information, including decorations, to home screen 510. At this point, home screen 510 has a full listing of applications across domains, returned in the same format as it would have gotten if it had just had application information from a single domain. The only difference between the information that home screen 510 has and the information it would have had if operating in a single domain environment is that the package names have been altered to contain domain information.

Again, prior to returning packages at message 550, if unified package manager 512 is also operating as the package manager of the hybrid domain, then the information in message 550 may also include the packages from the hybrid domain.

Figure 6:
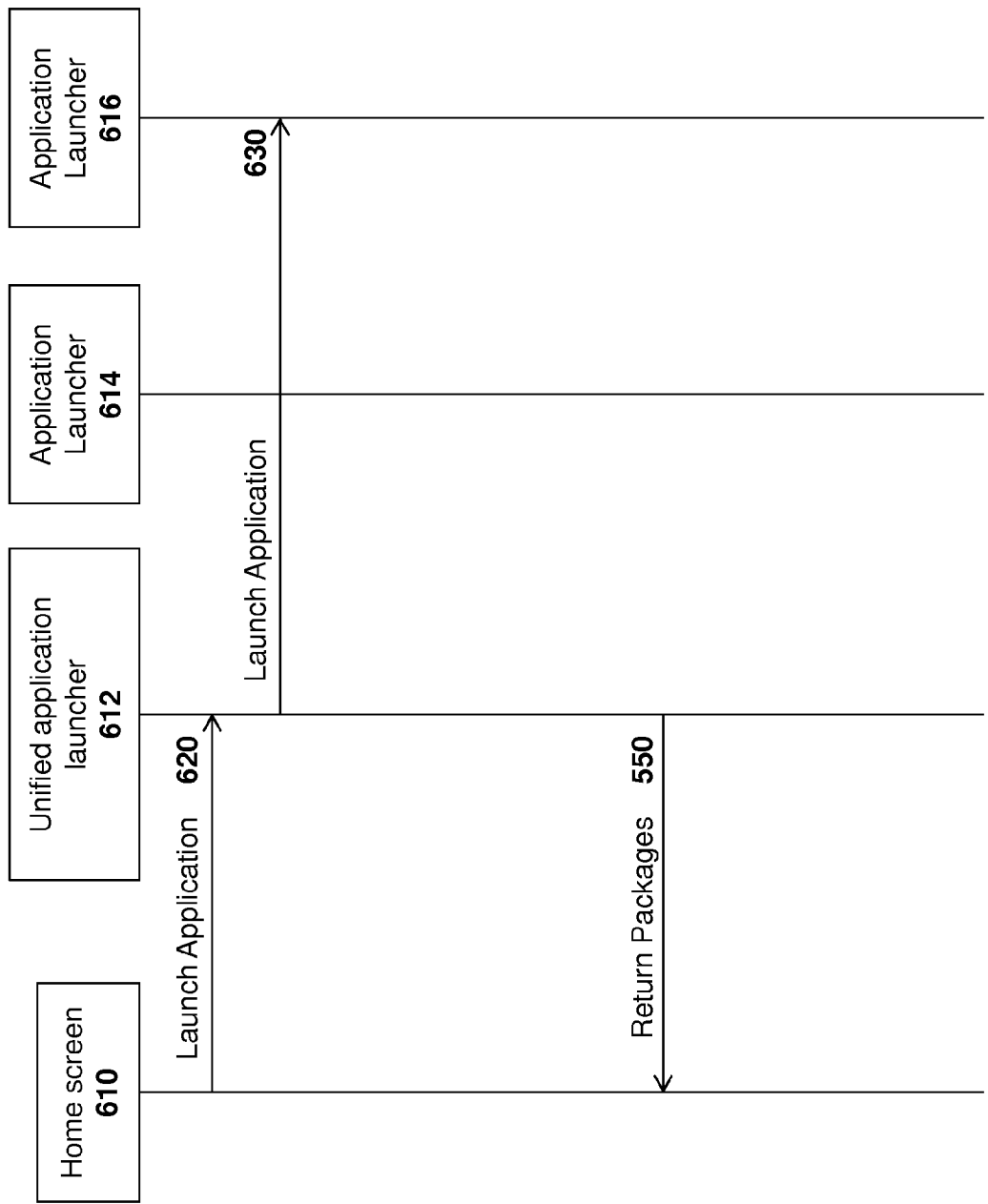
FIG. 6 is a dataflow diagram showing the launching of an application in a system having a plurality of domains.

Reference is now made to FIG. 6, which shows a flow diagram when home screen 610 tries to launch an application as a result of user interaction. In particular, in the example of FIG. 6, home screen 610 communicates with a unified application launcher 612. Further, a plurality of application launchers, shown as application launcher 614 and application launcher 616, are present, where each of application launchers 614 and 616 reside in a different domain.

In order to launch an application, the home screen 610 will send, using standard APIs, a launch application message 620. The launch application message 620 will include the previously fetched information about the package, including the now decorated package name. Such information includes the domain of the package.

Message 620 is intercepted by the unified application launcher 612, which checks the decoration on the incoming package information to see what domain the package resides in. In some cases, if the package resides in the hybrid domain then no decoration may have been added if the unified package manager also acted as the package manager on the hybrid domain. In this case, if no decoration exists then the unified application launcher 612 assumes that the domain that the application is in is the hybrid domain.

Once the domain is determined, as shown by arrow 622, the unified application launcher 612 contacts the appropriate application launcher in the correct domain to launch the application. For example, in FIG. 6, the unified application launcher 612 determines that the domain for application launcher 616 is the appropriate domain and thus the unified application launcher sends a launch application request 630 to application launcher 616. The launch application could be a similar message to that normally sent to the application launcher from a home screen in an operating system.

As will be appreciated, the unified application launcher will have to direct the communication to the appropriate domain, intercept the message and provide it to application launcher 616.

Once the application launcher 616 receives the launch application request, the device may switch its view to the correct domain so that the user can see the application that was just launched.

If the launch application message 620 is for an application in the hybrid domain and the unified application launcher 612 acts as the application launcher for the hybrid domain then the unified application launcher 612 may directly launch the requested application without further messages.

In either of the embodiments of FIGS. 5 and 6, if a particular domain is locked, for example for security purposes for a password from a user, the gathering of package information or the launching of an application may trigger a prompt to a user to enter password information so the transaction may continue. Thus, if in FIG. 5 the message 540 is sent to package manager 516 but package manager 516 is in a domain that is locked, the sending of the message may trigger a password request to a user of the computing device prior to the package information being returned in message 542. Similarly, in FIG. 6, the launch application command 630 may be sent to application launcher 616. However, if application launcher 616 is in a domain that is locked, the user may be prompted for a password prior to the application being launched.

Therefore, based on the above, the present disclosure provides a home screen which can show applications from several different operating systems in one screen. The home screen can further launch any of these applications, even if the applications are in a different host operating system.

A system and method are provided for modifying host domains whereby domain information is "decorated" to existing metadata when the home screen retrieves a list of applications. This decoration is later used when the home screen attempts to launch an application and the decorated application information may be submitted back to the core operating system which uses the domain information to figure out which domain the application needs to be launched in.

As a result of this, home screens do not have to be specifically written to recognize that they are operating in a multi-domain environment and the host operating system will take care of all of this for such home screen.

The processes of any of FIGS. 3 to 6 may be stored as program code in any tangible, non-transitory computer readable medium, which when accessed by a processor on the computing device may cause the processes to be executed.

As will be appreciated by those in the art, the above may be implemented on any computing device. If the above is implemented on a mobile device, one example mobile device is provided with regard to FIG. 7.

Mobile device 700 may be a two-way wireless communication device having voice and data communication capabilities. Depending on the exact functionality provided, the mobile device may be referred to as a data messaging device, a two-way pager, a wireless e-mail device, a cellular telephone with data messaging capabilities, a wireless Internet appliance, a wireless device, a user equipment (UE), or a data communication device, as examples.

Where mobile device 700 is enabled for two-way communication, it may incorporate a communication subsystem 711, including both a receiver 712 and a transmitter 714, as well as associated components such as one or more antenna elements 716 and 718, local oscillators (LOs) 713, and a processing module such as a digital signal processor (DSP) 720. Although not shown, communication subsystem 711 may include additional components. For example, mobile device 700 may comprise multiple receivers 712 and/or transmitters 714 to allow for simultaneous radio activity. In addition, as will be apparent to those skilled in the field of communications, the particular design of the communication subsystem 711 will be dependent upon the communication network in which the device is intended to operate.

Network access requirements will also vary depending upon the type of network 719. In some networks network access is associated with a subscriber or user of mobile device 700. A mobile device may require one or more smart cards which can contain different applications such as a USIM, RUIM or a SIM application in order to operate on a network. The smart card interface 744 is normally similar to a card-slot into which a smart card can be inserted and ejected. The smart card can have memory and hold many key configurations 751, and other information 753 such as identification, and subscriber related information.

Figure 7:
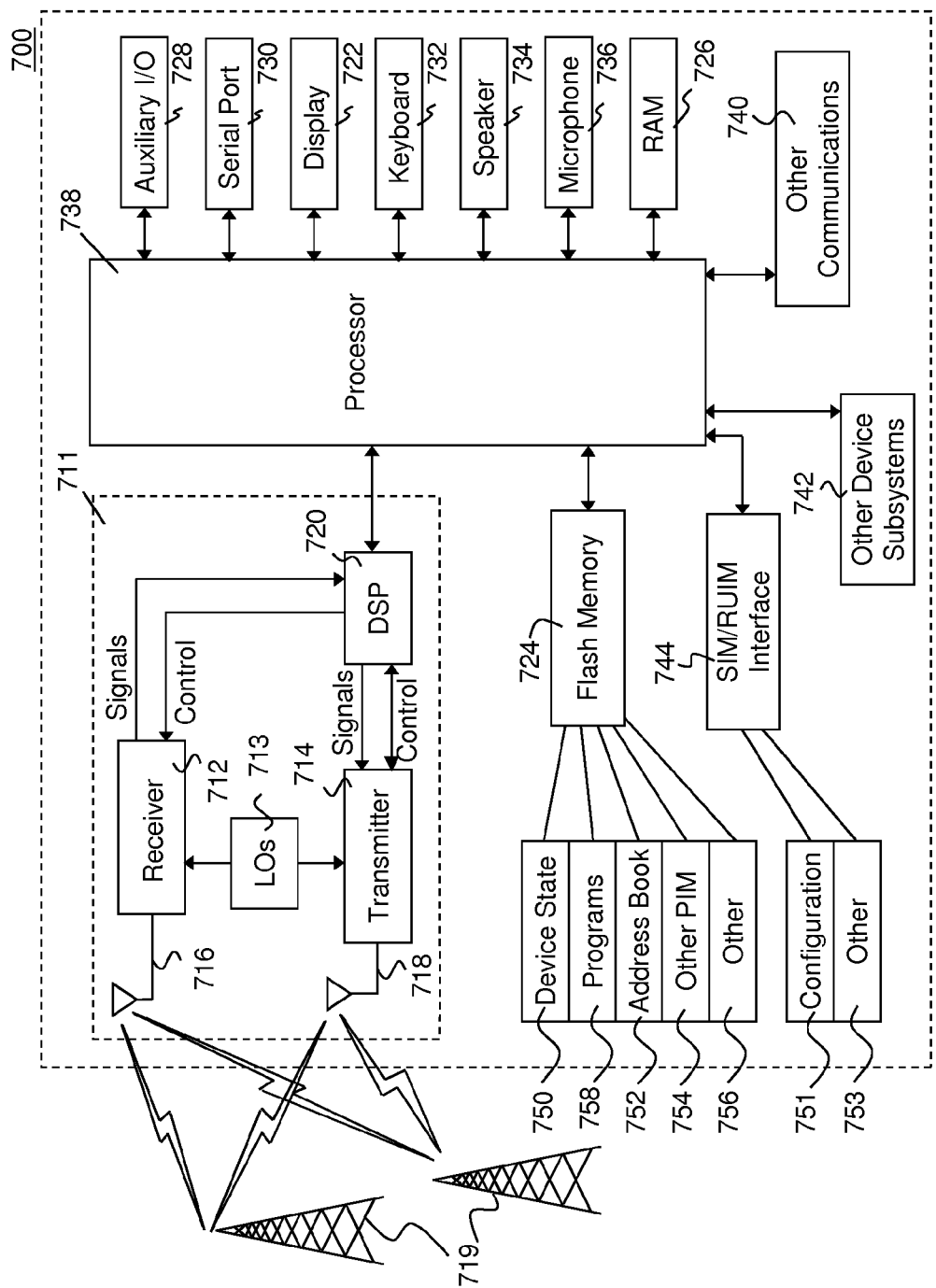
FIG. 7 is a block diagram of an example mobile device capable of being used with the embodiments of the present disclosure.

When required network registration or activation procedures have been completed, mobile device 700 may send and receive communication signals over the network 719. As illustrated in FIG. 7, network 719 can consist of multiple base stations communicating with the mobile device.

Signals received by antenna 716 through communication network 719 are input to receiver 712, which may perform such common receiver functions as signal amplification, frequency down conversion, filtering, channel selection and the like. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Mobile device 700 generally includes a processor 738 which controls the overall operation of the device. Communication functions, including data and voice communications, are performed through communication subsystem 711. Processor 738 also interacts with further device subsystems such as the display 722, flash memory 724, random access memory (RAM) 726, auxiliary input/output (I/O) subsystems 728, serial port 730, one or more keyboards or keypads 732, speaker 734, microphone 736, other communication subsystem 740 such as a short-range communications subsystem and any other device subsystems generally designated as 742. Serial port 730 could include a USB port or other port known to those in the art.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the processor 738 may be stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726.

As shown, flash memory 724 can be segregated into different areas for both computer programs 758 and program data storage 750, 752, 754 and 756. These different storage types indicate that each program can allocate a portion of flash memory 724 for their own data storage requirements. Processor 738, in addition to its operating system functions, may enable execution of software applications on the mobile device. A predetermined set of applications that control basic operations, including at least data and voice communication applications for example, will normally be installed on mobile device 700 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 719. Further applications may also be loaded onto the mobile device 700 through the network 719, an auxiliary I/O subsystem 728, serial port 730, short-range communications subsystem 740 or any other suitable subsystem 742, and installed by a user in the RAM 726 or a non-volatile store (not shown) for execution by the processor 738. Such flexibility in application installation increases the functionality of the device and may provide enhanced on-device functions, communication-related functions, or both. For example, secure communication applications may enable electronic commerce functions and other such financial transactions to be performed using the mobile device 700.

In a data communication mode, a received signal such as a text message or web page download will be processed by the communication subsystem 711 and input to the processor 738, which may further process the received signal for output to the display 722, or alternatively to an auxiliary I/O device 728.

A user of mobile device 700 may also compose data items such as email messages for example, using the keyboard 732, which may be a complete alphanumeric keyboard or telephone-type keypad, whether virtual or real, among others, in conjunction with the display 722 and possibly an auxiliary I/O device 728. Such composed items may then be transmitted over a communication network through the communication subsystem 711.

For voice communications, overall operation of mobile device 700 is similar, except that received signals would typically be output to a speaker 734 and signals for transmission would be generated by a microphone 736. Alternative voice or audio I/O subsystems, such as a voice message recording subsystem, may also be implemented on mobile device 700. Although voice or audio signal output is generally accomplished primarily through the speaker 734, display 722 may also be used to provide an indication of the identity of a calling party, the duration of a voice call, or other voice call related information for example.

Serial port 730 in FIG. 7 would normally be implemented in a personal digital assistant (PDA)-type mobile device for which synchronization with a user's desktop computer (not shown) may be desirable, but is an optional device component. Such a port 730 would enable a user to set preferences through an external device or software application and would extend the capabilities of mobile device 700 by providing for information or software downloads to mobile device 700 other than through a wireless communication network. The alternate download path may for example be used to load an encryption key onto the device through a direct and thus reliable and trusted connection to thereby enable secure device communication. As will be appreciated by those skilled in the art, serial port 730 can further be used to connect the mobile device to a computer to act as a modem.

Other communications subsystems 740, such as a short-range communications subsystem, is a further optional component which may provide for communication between mobile device 700 and different systems or devices, which need not necessarily be similar devices. For example, the subsystem 740 may include an infrared device and associated circuits and components or a Bluetooth™ communication module to provide for communication with similarly enabled systems and devices. Subsystem 740 may further include non-cellular communications such as WiFi or WiMAX.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as describedg herein.

The invention claimed is:

1. A method at a computing device having a plurality of concurrently operating domains for providing a unified home screen, the method comprising:
   sending a request from a home screen application on the computing device;

intercepting the request at a unified package manager on the computing device;
requesting, from the plurality of concurrently operating domains, package information;
receiving package information from at least one of the plurality of concurrently operating domains at the unified package manager on the computing device;
decorating the received package information with domain information for a domain from which the package information was received at the unified package manager on the computing device; and
providing the decorated package information to the home screen application;
wherein the home screen application is unaware of the unified package manager.

2. The method of claim 1, wherein the sending utilizes a standard application program interface.

3. The method of claim 1, wherein the received package information contains a package identifier.

4. The method of claim 3, wherein the package identifier is decorated by adding a domain identifier to the package identifier.

5. The method of claim 1, further comprising, sending a launch request from the home screen application, wherein the launch request contains the decorated package information for a package being launched.

6. The method of claim 5, wherein the launch request is intercepted by a unified application launcher on the computing device.

7. The method of claim 6, wherein the unified application launcher forwards the launch request to an application launcher for a domain identified in the decorated package information.

8. The method of claim 7, wherein, prior to forwarding, the computing device validates a user if the domain identified in the decorated package information is locked.

9. The method of claim 1, wherein the home screen and unified package manager are within a hybrid domain on the computing device, the hybrid domain capable of data access for all other domains on the computing device.

10. The method of claim 1, wherein the home screen application is unaware of the plurality of concurrently operating domains on the computing device.

11. A computing device having a plurality of concurrently operating domains and capable of providing a unified home screen, the computing device comprising:
a processor; and
memory,
wherein the computing device is configured to:
send a request from a home screen application on the computing device;
intercept the request at a unified package manager on the computing device;
request, from the plurality of concurrently operating domains, package information;
receive package information from at least one of the plurality of concurrently operating domains at the unified package manager on the computing device;
decorate the received package information with domain information for a domain from which the package information was received at the unified package manager on the computing device; and
provide the decorated package information to the home screen application;
wherein the home screen application is unaware of the unified package manager.

12. The computing device of claim 11, wherein the computing device is configured to send by using a standard application program interface.

13. The computing device of claim 11, wherein the received package information contains a package identifier.

14. The computing device of claim 13, wherein the package identifier is decorated by adding a domain identifier to the package identifier.

15. The computing device of claim 11, further configured to send a launch request from the home screen application, wherein the launch request contains the decorated package information for a package being launched.

16. The computing device of claim 15, wherein the launch request is intercepted by a unified application launcher on the computing device.

17. The computing device of claim 16, wherein the unified application launcher forwards the launch request to an application launcher for a domain identified in the decorated package information.

18. The computing device of claim 17, wherein, prior to forwarding, the computing device validates a user if the domain identified in the decorated package information is locked.

19. The computing device of claim 11, wherein the home screen and unified package manager are within a hybrid domain on the computing device, the hybrid domain capable of data access for all other domains on the computing device.

20. The computing device of claim 11, wherein the home screen application is unaware of the plurality of concurrently operating domains on the computing device.

* * * * *

UNITED STATES PATENT AND TRADEMARK OFFICE
CERTIFICATE OF CORRECTION

PATENT NO. : 9,501,336 B2  
APPLICATION NO. : 14/290316  
DATED : November 22, 2016  
INVENTOR(S) : Ravi Singh et al.

Page 1 of 1

It is certified that error appears in the above-identified patent and that said Letters Patent is hereby corrected as shown below:

In the Claims

Column 11, Line 5, In Claim 1, please insert --the-- between "receiving" and "package".

Column 12, Line 7, In Claim 11, please insert --the-- between "receive" and "package".

Signed and Sealed this  
Thirty-first Day of January, 2017

Michelle K. Lee  
*Director of the United States Patent and Trademark Office*